Figure 1:
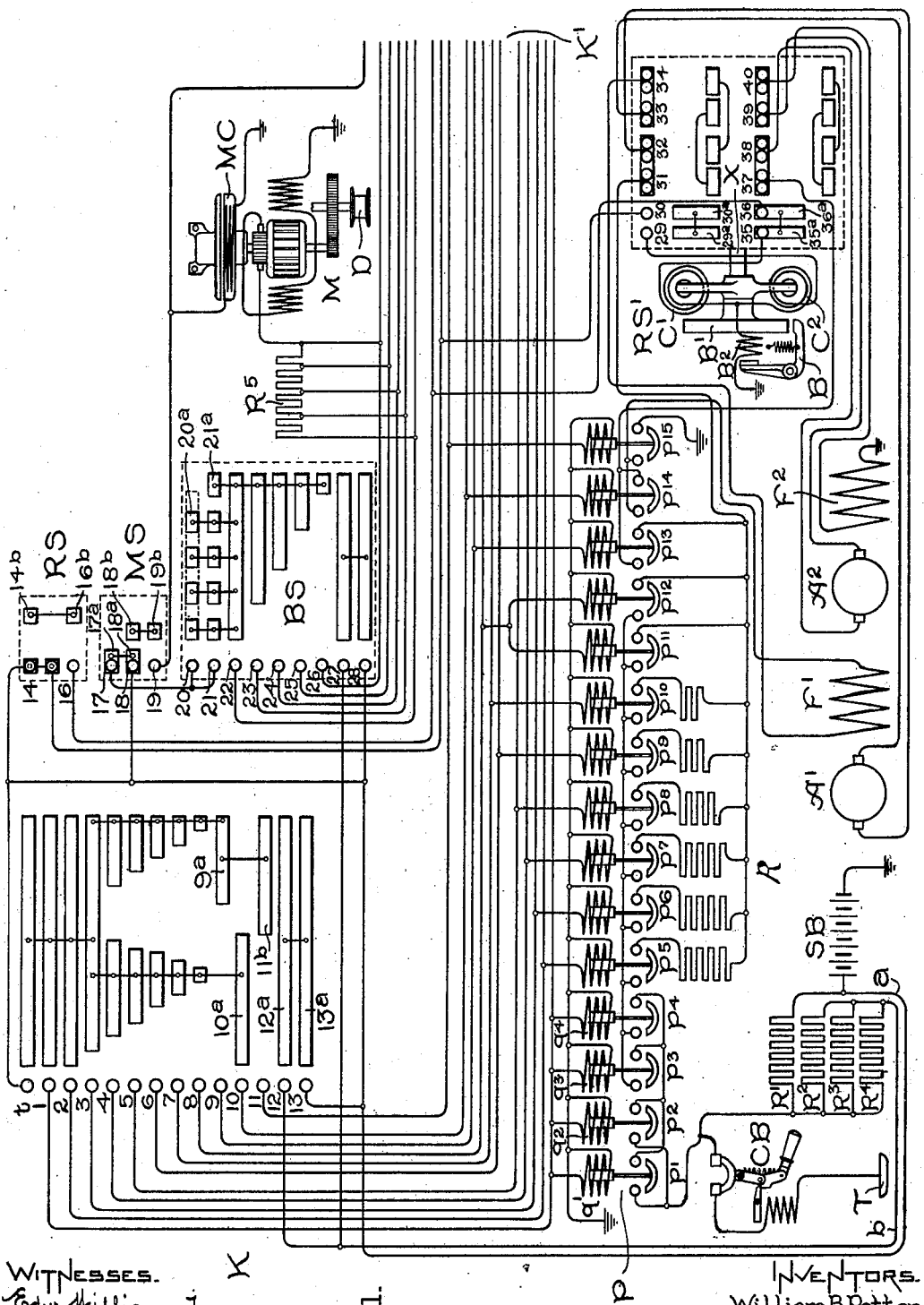

No. 678,196. Patented July 9, 1901.
W. B. POTTER & F. E. CASE.
ELECTRIC CONTROL SYSTEM.
(Application filed Sept. 17, 1898.)

(No Model.) 4 Sheets—Sheet 1.

Witnesses.
Edw. Williams, Jr.
A. F. Macdonald.

Inventors.
William B. Potter,
Frank E. Case,
by Albert G. Davis
Atty.

No. 678,196. Patented July 9, 1901.
W. B. POTTER & F. E. CASE.
ELECTRIC CONTROL SYSTEM.
(Application filed Sept. 17, 1898.)
(No Model.) 4 Sheets—Sheet 2.
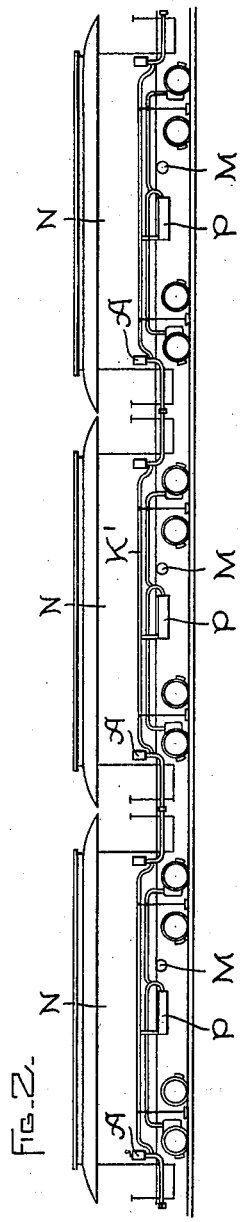
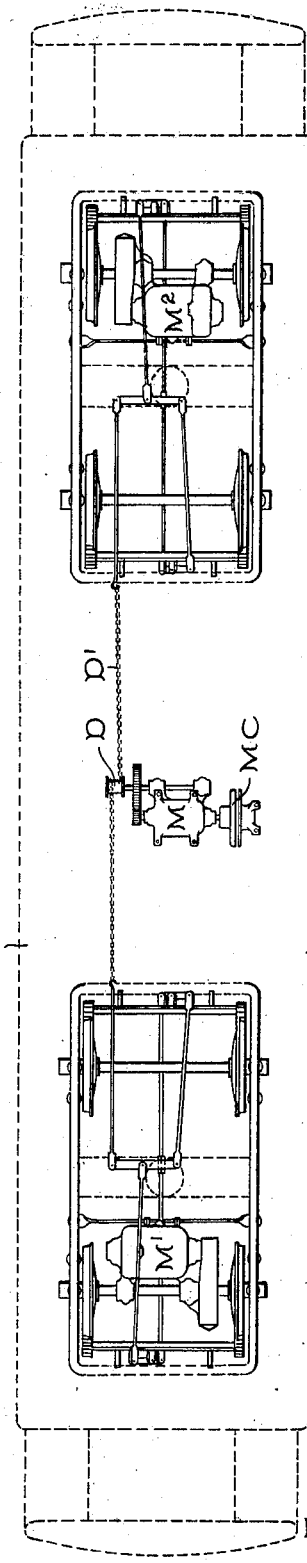
Witnesses
Edw. Williams, Jr.
A. F. Macdonald.
Inventors
William B. Potter,
Frank E. Case,
by Albert G. Davis
Atty.

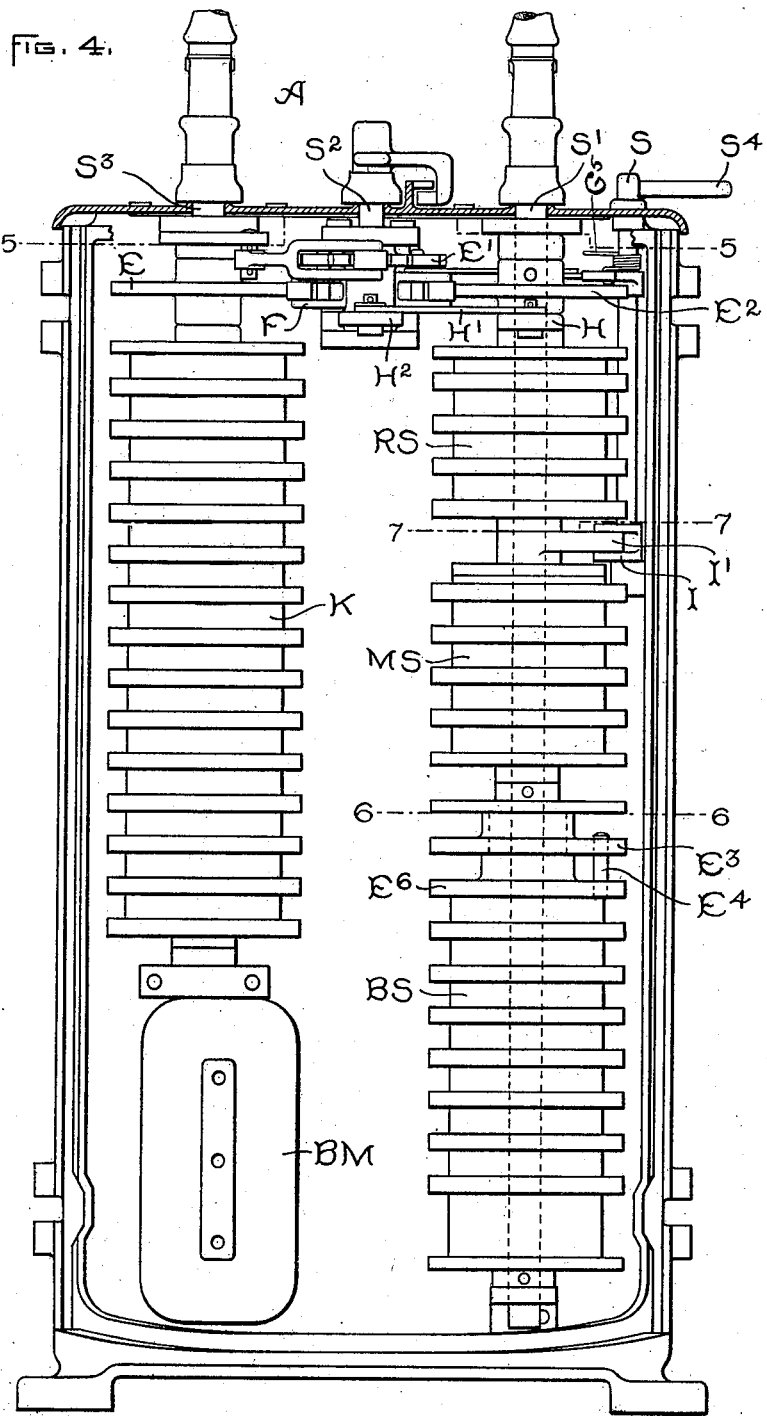

No. 678,196. Patented July 9, 1901.
W. B. POTTER & F. E. CASE.
ELECTRIC CONTROL SYSTEM.
(Application filed Sept. 17, 1898.)
(No Model.) 4 Sheets—Sheet 4.
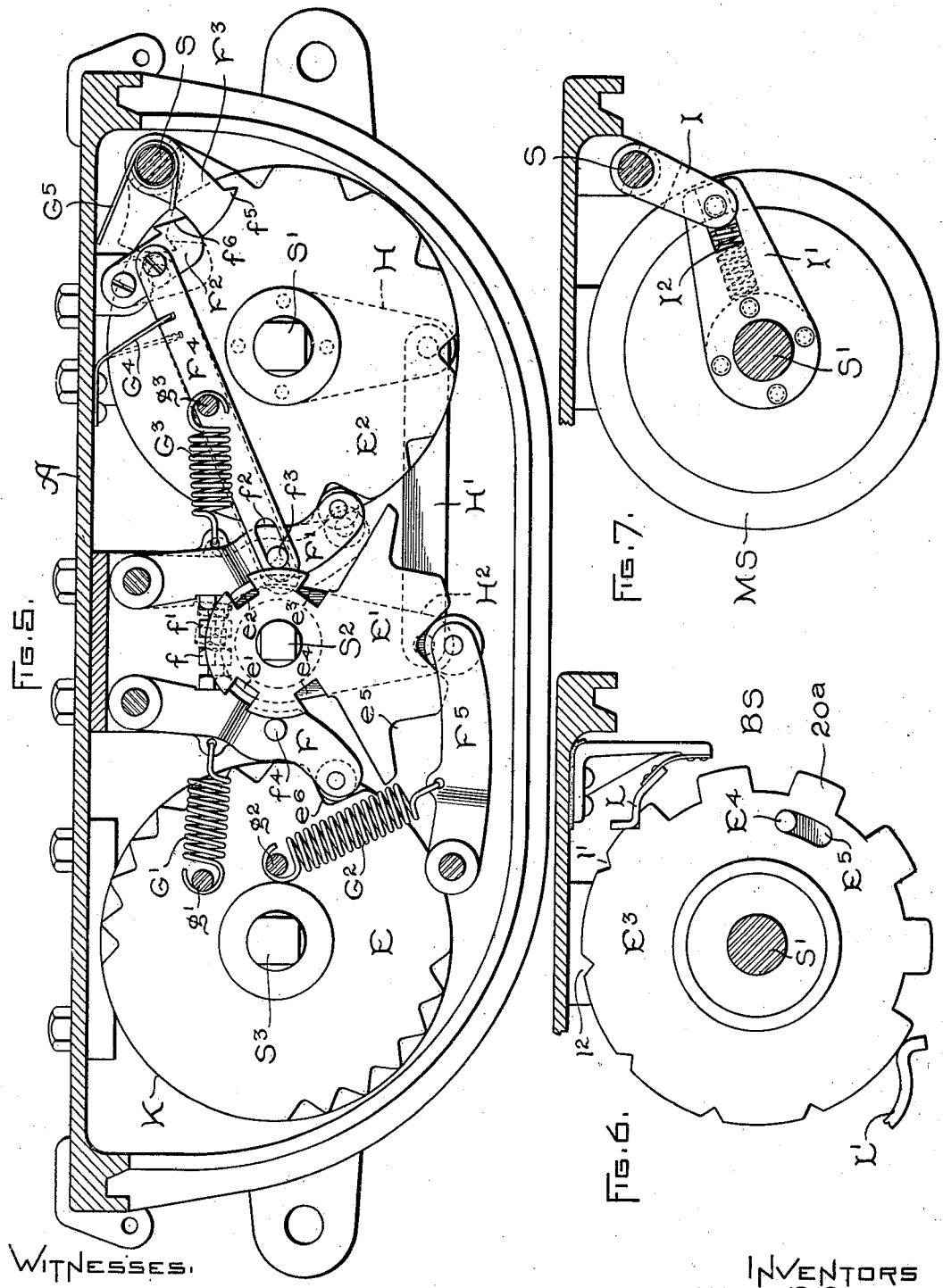
WITNESSES:
A. H. Abell.
A. F. Macdonald.
INVENTORS
William B. Potter,
Frank E. Case,
by Albert G. Davis
Atty.

UNITED STATES PATENT OFFICE.

WILLIAM B. POTTER AND FRANK E. CASE, OF SCHENECTADY, NEW YORK, ASSIGNORS TO THE GENERAL ELECTRIC COMPANY, OF NEW YORK.

ELECTRIC CONTROL SYSTEM.

SPECIFICATION forming part of Letters Patent No. 678,196, dated July 9, 1901.

Application filed September 17, 1898. Serial No. 691,161. (No model.)

*To all whom it may concern:*

Be it known that we, WILLIAM B. POTTER and FRANK E. CASE, citizens of the United States, residing at Schenectady, county of Schenectady, State of New York, have invented certain new and useful Improvements in Electric Control Systems, (Case No. 776,) of which the following is a specification.

Our invention relates particularly to the control of electric-railway vehicles and trains, and has for one of its objects to provide an efficient brake actuated by electric current.

Various forms of apparatus have been devised applicable to the control of trains propelled by electric motors, each of the cars of which is furnished with its own controller and motors, all of the controllers being arranged to be operated by one or more "master-controllers," so called, situated at different points, from any one of which it is possible to operate the train. The advantages of this arrangement are apparent, as each of the cars may for the time be the head of the train, or the train, no matter of how many cars it may be made up, may be run backward or shifted in one direction or another (as in switching) with facility from any one of a number of different points. It is especially to this particular class of apparatus that our invention relates. It aims to provide for such apparatus a convenient form of braking, in which the ordinary brake-rigging of the car will be used and be operated by a rotary electric motor of sufficient power. As a convenient form of detent for this motor, acting to stop its rotation wherever desired, we employ a magnetic clutch.

The general type of controlling apparatus herein illustrated as a convenient embodiment of the invention has separate electromagnetically-operated contacts for the motor-current, each of these contacts being controlled by its own solenoid and the current being admitted or shut off by the master-controller. To provide against those occasions when the trolley-current fails, we employ a storage battery with resistances arranged so that the full-line potential is not necessary, thus permitting the use of a battery of limited size. A reversing-switch is also provided, and this also is electrically operated under the control of the master-controller.

To operate the devices just briefly described, we have devised a controlling-switch or master-controller presenting several features of novelty. It comprises, in brief, a motor-regulating switch, a brake-switch, a switch by which the magnetic clutch is controlled, and a reversing-switch. These switches are provided with separate operating means, and we have interlocking devices so arranged that improper manipulation is rendered impossible. It is not enough in this case to provide interlocks, by which only one of the switches can be operated at any one time. This has become a common feature in the art of making controlling-switches; but in our invention there are times when more than one of the switches must be operated at the same time—for instance, when the brake-motor is applied there are steps in its application or points when the motor has become stationary and at which it is desired to hold it. Under these conditions we have arranged to apply the magnetic clutch, so as to hold the braking-motor. Other features of the interlocking device will be apparent from the description and drawings.

Our invention comprises other features of novelty to be hereinafter pointed out and claimed.

The drawings show a system in which our invention has been embodied.

Figure 1 is a diagram of the circuits. Figs. 2 and 3 show, respectively, in side elevation and plan a train equipped with the apparatus of our invention and a single car-truck having the apparatus applied thereto. Fig. 4 is a front elevation, with the cover removed, of the switches in the controlling device. Fig. 5 is a plan, partly in section on the line 5 5 of Fig. 4 and with the cover removed, of the interlock. Figs. 6 and 7 are details in plan section on the line 6 6 and 7 7 of Fig. 4.

In Fig. 1 we have shown the circuits as applied to a magnetically-operated controller having separate contacts, similar to that shown in the application of Frank E. Case, Serial No. 671,994, filed February 28, 1898. In this figure the motor-controller is shown at P with separately-actuated contacts lettered, respectively, from $p'$ to $p^{15}$. The contacts of the master-controller are shown in the upper part of the figure. Those designed for regulating the car-motors are shown at K, embracing the reversing-switch, the switch for controlling the magnetic clutch and the brake-switch are lettered, respectively, RS, MS, and BS. These last three switches are preferably mounted on the same shaft, though arranged to be separately operated. The magnetic clutch is lettered MC and the braking-motor M. As will be seen, this motor is of the rotary type and is geared to the drum D, upon which the brake-chain is to be wound as the motor revolves. The trolley T is shown as a collecting-shoe appropriate for the now well-known third-rail railways. A circuit-breaker CB is shown in the trolley-lead, and a storage battery SB is also illustrated. Resistances R' to $R^4$ are provided to cut down the potential between the trolley, the storage battery, and the master-controller. The arrangement of these is such that current is delivered from the trolley-lead to the storage battery through the resistance R'. It will be observed that bringing the master-controller to the off position does not interrupt this circuit. The master-controller operates the contacts $p'$, &c., through the solenoid-coils $q'$, &c., and the current in these coils is, as will be seen, at reduced potential, the current-flow being either from the storage battery through the lead $a$ or from the trolley through the resistance $R^2$ to $R^4$ and the lead $b$. In this case the storage battery acts to equalize the potential across the solenoids, so that whether many or few of them be in circuit the potential will be practically the same. The motor-reversing switch RS' is also included in the controller P. As already pointed out, this is electromagnetically operated by means of coils $C'$ $C^2$. A brake B, acting upon brake-wheel B', holds the switch in whichever position it may be thrown by the current after the latter is turned off.

A description of the first circuit established by the motor-controller K will be sufficient for the purpose of this application to render clear the operation of the device. Current enters at the trolley T and passes through circuit-breaker CB and the resistances $R^2$ to $R^4$ and thence to the contact $t$ upon the master-controller K. When these contacts are brought to the first position of the controller, in which they touch the rectangular contacts, (the latter being the development in plane of the ordinary cylindrical switch,) contacts 1, 2, 10, 12, and 13 are brought into circuit. It will be seen that the lead from contact 1 passes to the first four solenoid-coils $q'$ to $q^4$ and closes contacts $p'$ to $p^4$. The lead from contact 2 closes the circuit through the contact $p^5$ in the same way, thus throwing in the first section of the resistance R. The lead from contact 10 closes contact $p^{14}$. Though the battery SB is normally connected to line through the resistance R', yet when the master-controller K is placed in an operative position the contacts 12 13 touch the plates $12^a$ $13^a$ and act to throw in the resistances $R^2$ $R^3$ $R^4$ in multiple with the resistance R'. This serves to reduce the resistance in series between the battery and the line whenever it is called upon to give out current and allows some current to flow from the trolley T through the multiple bank of resistances to the coils of the separately-actuated contacts and thence to ground, thus reducing the amount of storage-battery capacity required. The path of the motor-current with the connections thus established by the first position of the master-controller is as follows: from the trolley T through the circuit-breaker, then through the contacts $p'$ $p^2$ $p^3$ $p^4$, which, as will be seen, are arranged in two series banks of two each in multiple, through the contact $p^5$ to the first section of the resistance R, whence it passes to the right to the contact 31 upon the reversing-switch RS', then to contact 32, through the armature A', back to the reversing-switch at contacts 33 and 34, through the field F', then across contact $p^{14}$ of the controller P to contacts 37 and 38 upon the reversing-switch, through the armature $A^2$, then through the contacts 39 and 40, through the field $F^2$, to ground. As the master-controller K is moved so that the other developed contacts touch the fixed contacts 3 to 8, the other resistance-contacts of the controller P (lettered $p^6$ to $p^{10}$) are closed and more resistance-coils are cut in in multiple, and finally contacts $p^{11}$ $p^{12}$ short-circuit the resistances. Part of these resistance-contacts are then opened as the stationary contacts 5, 6, 7, and 8 pass off the moving plates of the controller to increase the resistance of the motor-circuit. At this point the contacts 10 and 11, respectively, touch plates $10^a$ and $11^b$, so that contacts $p^{14}$ $p^{15}$ are simultaneously closed. This has the effect of connecting the terminal of field F' both to the plus terminal of the armature $A^2$ through the contact $p^{14}$ and contacts 37 38 of the reversing-switch RS and at the same time connecting the field to ground through contact $p^{15}$, thus throwing a shunt around the second motor. When the contact 10 passes off plate $10^a$, this shunt is opened, and when the contact 9 touches the plate $9^a$ the two motors are thrown in multiple, the first of these actions taking place when the contact $p^{14}$ is opened and the second when the contact $p^{13}$ is closed, this furnishing a direct path for current to contacts 37 and 38 of the reversing-switch RS' through the armature $A^2$ and through the field $F^2$ by the contacts 39 and 40 on the same switch. This method of passing from series to parallel by shunting one motor after cutting in resistance enough to protect the apparatus is well known in the art.

The motor-reversing switch RS' is operated by master reversing-switch. (Shown developed in plane on the right and marked RS.)

When these contacts are in the illustrated position, the switch has already been operated and the contacts 29 and 30 are seen to be open-circuited. If the switch be thrown so that $14^b$ and $16^b$ touch the contacts 14 and 16, the path of the current is as follows: from the trolley through the circuit-breaker and the resistances $R'$ or from the storage battery SB to the contact 14, to $14^b$, and to $16^b$, then to the contact 36 upon the reversing-switch RS', by the cross connection to contact 35, through the coil $C'$, through the coil $B^2$, to ground. The effect of this as the coil $C'$ draws in its core will be to rotate the switch RS' around the shaft X. At the same time the armature of the coil $B^2$ will be attracted, withdrawing the brake B from the brake-wheel $B'$. The rotation of the switch will cause contacts $35^a$ and $36^a$ to pass from under the fingers 35 36, open-circuiting the leads of the coil $C'$. The coil $B^2$ will also be deënergized and the brake B will be applied, thus holding the reversing-switch until switch RS is again thrown to its illustrated position, when a similar action will take place involving the contacts 29 and 30, which are then in the same relation with respect to plates $29^a$ and $30^a$ that contacts 35 and 36 are in relation to $35^a$ and $36^a$ in the illustrated position of the reversing-switch RS'.

The magnetic clutch MC is controlled by the motor-switch MS. In the illustrated position the clutch is then open-circuited, and therefore has no effect on the brake motor-shaft; but if contacts $18^b$ $19^b$ of the switch MS be brought into operative relation with contacts 18 and 19 current will be sent through the clutch, and in this relation it will hold the motor in whatever position it may happen to be. As shown, the operation of the switch MS acts to open-circuit the switch BS, so that if the clutch be applied the motor M will have no tendency to rotate while the current is cut off.

The motor M is operated from the switch BS. The path of the current through this switch is from the trolley T to contact 18 of the clutch-switch MS, to contact 17, and then to contacts 20 and 21. These contacts are in multiple and coöperate with the contacts $20^a$ $21^a$, &c. The upper row of these is arranged to occupy a different relation to the lower in going off and coming on. It is desirable that the connections to brake the motor be uninterrupted in applying the brake, so that the torque will progressively increase and the brakes be applied with greater and greater energy as the brake-switch is rotated from its off position to the final position, in which all the sections of the resistance $R^5$ are cut out. We therefore so arrange the contacts $20^a$, &c. (as will be further described when explaining the mechanical embodiment of the invention) that in going on they occupy a dotted-line position, as shown in Fig. 1, while in coming off the contacts are both in the position shown in full lines, and thus the circuit of the motor will be interrupted periodically.

Current passes from these contacts to contact 22, thence through the resistance $R^5$, sections of which are progressively cut out until the motor is connected directly between the trolley and ground. The two lower contacts 27 28 upon the brake-switch BS are for the purpose of cutting in the resistance $R^2$ $R^3$ $R^4$ in multiple with the resistance $R'$ and act just as do the contacts 12 13 of the switch K. It will thus be seen that even when the trolley-current is for any cause interrupted the controller may be operated and the brakes may be set or released by current from the storage battery. Further, this arrangement makes it possible to use magnet-coils and a brake-motor wound for, say, one hundred volts upon a five-hundred-volt circuit. It is highly difficult in practice to build a very small motor or a magnet-coil which will operate well upon a five-hundred-volt circuit. The arrangement shown further prevents the storage battery, which is in general of small capacity, from being short-circuited by the car-motors when the trolley-circuit fails.

In Fig. 2 we illustrate a train of three cars N N N with braking-motors M M, controllers P, and the master-controllers A in conventional diagram. Fig. 3 shows the same parts, but of one car only. It will be seen that the cable $K'$ extends through the train and is connected to all of the master and motor controllers. The result is that all of the motor-controllers of the train may be energized from any one of the master-controllers.

In Figs. 4 and 5 we show the mechanical structure of the master-controller. The reference-letters in Fig. 4 correspond to those employed in describing the circuits of the apparatus. RS is the part of the master-controller controlling the reversing-switch, MS the part controlling the magnetic clutch, and BS the brake-switch. K is the motor-controlling switch. BM shows the coil of the blow-out magnet, the other parts being removed. None of the fixed contacts are shown, as they are sufficiently indicated in the diagram of the circuits.

The means of operating each of the switches just described is as follows: The motor-controlling switch K is mounted on the shaft $S^3$ and is operated in the usual manner by its own separate handle. The reversing-switch RS, although mounted on the shaft $S'$, is operated by a handle fixed to the shaft $S^2$ by means of an arm $H^2$, rotating with the latter shaft, an arm H, fixed to the sleeve carrying the switch RS, and a connecting-link $H'$. The switch MS of the magnetic clutch is operated by the handle $S^4$, fixed to the shaft S upon the right side of the controller through an arm I, fixed to the shaft, and another arm $I'$, fixed to the sleeve of the switch MS. This construction is best seen in Figs. 4 and 7. A spring $I^2$ is provided by which the switch is brought readily to its off position, this action being assisted by the spring $G^5$. (Shown in Figs. 4 and 5 and presently to be described.)

The brake-switch BS is fixed to the shaft S' and is operated by its own independent handle fixed to the same shaft. The interlocking arrangements between these several switches are best seen in Figs. 4 and 5. Referring to these figures, E is the "star-wheel" or ratchet of the controller K. E' is a cam rotating with the shaft $S^2$ of the reversing-switch handle, and $E^2$ is a star-wheel fixed on the shaft S'. The two star-wheels act as step-by-step devices of well-known character for the motor-controlling switch and the brake-switch. With the wheel E coöperates a pawl F, having the usual cam-roller. A similar pawl $F^5$ coöperates with the cam E', and F' with the wheel $E^2$. Springs $G'$ $G^2$ $G^3$, fixed to pins $g'$ $g^2$ $g^3$, hold these pawls in engagement with the star-wheels. The pins are shown in section to indicate that they are fixed to the cover of the controller, which is not illustrated. Upon the shaft S, actuating the switch of the magnetic clutch, is a dog $F^3$, against which bears the spring $G^5$, already referred to. Another dog $F^2$ in the illustrated position prevents the operation of the dog $F^3$. A link $F^4$ is fixed at one end to the dog $F^2$. The other end is slotted at $f^2$, and in the slot is a pin $f^3$, fixed in the pawl F'. A spring $G^4$ keeps the pin $f^3$ in the end of the slot $f^2$ and normally holds the dog $F^2$ in the illustrated position. In the cam E' are provided notches $e'$ to $e^4$. When the circular portion of the cam-surface between these notches is opposite the pins $f^3$ $f^4$ of the pawls F' F, these latter cannot be moved from the notches in the star-wheels $E^2$ E, thus locking the star-wheels in position so long as the reversing-switch, with its cam E', is in the intermediate position in which the contacts are broken. When this switch is thrown, for instance, so that the roller of the pawl $F^5$ is in the notch $e^5$, the notch $e'$ permits the pin $f^4$ to enter as the star-wheel E is rotated. The notch $e^6$ in the wheel E is so deep as to allow the reversing-switch to be operated when the motor-switch is in the position shown, but the other notches in the wheel E are so shallow that the pin $f^4$ is not withdrawn entirely from the notch $e'$ except when the switch K is in its off position. A similar arrangement is found in the plate $E^2$, so that the reversing-switch is locked until the other switches are turned off. At the same time the pin $f^3$ is free to enter the notch $e^3$, so that the brake-switch may be applied whenever the reversing-switch is in either the forward or back position. Set-screws $f$ $f'$ are arranged upon the backs of the pawls F F', so that when one of these is in its dotted-line position the other cannot be so moved as to permit its switch to turn.

In bringing the train to a stop it is desirable to hold the braking-motor at whatever point it may be set. This we accomplish by the magnetic clutch. The manipulation of this switch at the proper time is of course of importance, as the braking-motor could not revolve if the clutch were set. This is provided for by the dogs $F^2$ $F^3$. After the brake-switch has been partially revolved, so that the pawl F' is in the dotted-line position, the link $F^4$ draws the dog $F^2$ to its dotted-line position, after which the switch MS may be turned, bringing the dog $F^3$ to the dotted-line position and holding it there by the toe $f^5$. The beveled portion $f^6$ of the dog $F^2$ permits the dog $F^3$ to push against the link $F^4$, the slot $f^2$ permitting the latter to slide over the pin $f^3$, while the spring $G^4$ retracts the link and the dog $F^2$, so that it engages with the toe $f^5$. When the brake-switch is manipulated so that the roller of the pawl F' is brought up to the circular portion of the wheel $E^2$, the pin $f^3$ pulls upon the link $F^4$ and releases the dog $F^3$, the spring $G^5$ coöperating with the spring $I^2$ (see Fig. 7) to throw the magnetic clutch-switch MS to the position in which the clutch is released. This action being automatic, it is impossible for the motorman to apply the brake without at once releasing the clutch, and thus no harm can be done to the braking-motor.

In Fig. 6 we show a plan view of the arrangement indicated in Fig. 1 by which some of the contacts of the brake-switch are shifted. The upper set of contacts $20^a$, &c., of the switch BS is here illustrated. The wheel $E^3$, which carries these contacts, is provided with a slot $E^5$, in which plays a pin $E^4$, connected to the next lower row of contacts. The contact-wheel $E^3$ is sleeved upon the sleeve carrying the switch BS, so that as the switch rotates the pin $E^4$ is first brought to one end or the other of the slot $E^5$, after which the wheel $E^3$ rotates in unison with the rest of the switch.

As already pointed out, when going on the contacts $E^6$ are in the dotted-line position, so that the multiple contacts 20 and 21 of Fig. 1 continuously supply current to the switch BS; but when the switch is being retracted the pin $E^4$ occupies the position illustrated in Fig. 6 and the contacts $20^a$ are in line with the contacts $21^a$, so that the supply of current is broken at each step of the switch. Notches $l'.l^2$ coöperate with the detent L, so that the wheel $E^3$ is held against accidental displacement. At L' is shown one of the controller-contacts.

In operating a car or train equipped in accordance with our invention the motorman stations himself at one of the master-controllers A, preferably at that one which happens to be at the front of the car or train. He places the proper handle upon the reversing-switch and throws it in one direction or the other, according to the direction in which he desires the car to move. This causes the cam-wheel E', Fig. 5, to rotate and unlocks the disks E $E^2$, thus allowing the handles of the switches K and BS to be turned. This movement of the reversing-switch also sends current from the storage battery SB, Fig. 1, through the reversing-switch RS to one or the other of the coils C' C² and actuates the motor-reversing switch RS' in the proper direction. The next step is to turn the shaft S³ of the switch K. This cuts in the resistances R² R³ R⁴ in multiple with the resistance R', as above explained, and sends current to the contacts $p'$, $p^2$, $p^3$, $p^4$, $p^5$, and $p^{14}$. Current now flows from the trolley through the circuit-breaker and contacts $p'$, &c., through the resistance R, and through the motors to ground. Further rotation of the shaft S³ gradually reduces the resistance in series with the motor, then increases it, makes the change to parallel, and finally short-circuits the resistance. The car is now running at full speed. Imagine now that it is desired to apply the brakes. The master reversing-switch is in the forward position, so that the cam E' of Fig. 5 is in such a position as to allow the disk E² to be turned; but the disk E is in such a position that the roller at the end of the arm F does not rest in the notch $e^6$, but rests in a shallow notch. The result is that the nut $f$ occupies the dotted-line position, so that the arm F' is locked in the position shown in the drawings by the contact of the two nuts $f$ and $f'$. It is therefore necessary to return the switch K to the off position—namely, the position shown in the drawings. When this is done, the reversing-switch still remaining in the forward position, the shaft S', Fig. 4, is rotated. This causes the disk E³, Fig. 6, to slip upon the disk E⁶, so as to bring the contacts 20ª in the dotted-line position, Fig. 1. This movement also admits current to the brake-motor M, though in series with the whole resistance R⁵. This causes the motor to wind up the brake-chain; but the resistance R⁵ prevents it from exerting a very large torque. The motor M is purposely so built that it is capable of becoming and remaining stationary at that point where the torque necessary to put further tension on the brake-chain is greater than the torque furnished by the motor with the resistance in the particular adjustment in which it may happen to be. Further movement of the switch-shaft S' causes the resistance R⁵ to be gradually cut out, and thus increases the torque upon the brake-chain.

The brakes may be held at any desired tension by simply leaving the handle of the switch BS at the proper point. If it is desired to reduce the tension, the handle will be moved in the off direction. This will cause the plate E³ to slip upon the plate E⁶ and will put the contacts 20ª in their full-line position, Fig. 1. This will cause the circuit of the motor M to be momentarily interrupted as each additional resistance is cut in and will allow the motor M to slip to a position corresponding to the torque which it is supposed to exert with the additional resistance in place. Thus the gradual motion of the shaft S' in the off direction serves to gradually release the tension upon the brake-chain.

It will be noticed that the first rotation of the shaft S', and therefore of the disk E², locks the reversing-switch and also locks the power-switch K. Further, this rotation withdraws the cam F² and leaves the dog F³ free to move to the left in Fig. 5. It is therefore possible to apply the clutch MC by the operation of the switch MS in any operative position of the brake-switch BS. This is accomplished by the proper rotation of the handle S⁴ of Fig. 4. Such rotation acts first to close the circuit of the clutch MC by the engagement of the contacts 18 and 19 of Fig. 1 with the plates 18ᵇ 19ᵇ. Just after these contacts engage, as described, the contacts 17 and 18 leave the plates 17ª 18ª and open-circuit the switch BS and the motor M. The brake is thus held in any position in which it may happen to be; but, as above described, any motion of the shaft S' of the switch BS in either direction to increase or decrease the braking power causes the switch MS to be automatically thrown to the position illustrated in Fig. 1.

We have thus devised an arrangement applicable either to a single car or to a long train of cars, capable of controlling the apparatus for movement in either direction at any required speed or for braking with any desired gradation or adjustment. It will be obvious that the various features of our invention are not in any way limited to master-controller systems, but may be used with switches acting directly upon the motors. It will also be obvious that various changes may be made without departing from the spirit and scope of the invention.

What we claim as new, and desire to secure by Letters Patent of the United States, is—

1. The combination of a rotary electric motor acting upon the ordinary brake-rigging of a car or moving load, means for varying the torque of said motor, a magnetic clutch for stopping the rotation of the motor and holding it at any desired position, and means for releasing the clutch when current is admitted to the motor.

2. The combination of a braking-motor with a magnetic clutch, means for actuating the clutch, means for controlling the torque of said motor, and a device actuated by the motor-controller for releasing the clutch when current is admitted to the braking-motor.

3. A controlling device having a brake-switch, a switch for controlling a magnetic clutch, means for locking the clutch-switch until the brake-switch is turned on, and means actuated by the operation of the brake-switch for automatically releasing the clutch.

4. The combination of a braking-motor, a magnetic clutch, means for controlling said motor, a switch for closing the circuit of the clutch, a device for locking said switch when closed, and means actuated by the motor-controlling means for unlocking said switch.

5. In combination, a switch for controlling a braking-motor, a clutch-controlling switch, means tending to maintain said clutch-controlling switch normally open, a device for locking said switch when closed, and means actuated by the movement of the motor-controlling switch for unlocking said clutch-controlling switch.

6. In combination, a switch for controlling a braking-motor, a clutch-controlling switch, interlocking means so arranged that the clutch-controlling switch cannot be thrown unless the motor-controlling switch is in an operative position, a locking device for holding said clutch-controlling switch when thrown, and means actuated by the movement of the motor-controlling switch for unlocking said clutch-controlling switch.

7. The combination of power-switch, reversing-switch and brake-switch, with a switch for controlling a magnetic clutch, interlocking devices preventing the simultaneous movement of more than one of the first three switches, and a device preventing the movement of the magnetic clutch-switch until the brake-switch has been operated.

8. The combination of a reversing-switch, a brake-switch, and a switch for operating a magnetic clutch, means for operating the switches independently, interlocking mechanism between the reversing-switch and the brake-switch, and mechanism permitting the movement of the clutch-switch only after the brake-switch has left the "off" position.

9. The combination of a reversing-switch, a brake-switch, and a switch for operating a magnetic clutch, all mounted upon a single shaft; means for operating the switches independently, interlocking mechanism between the reversing-switch and the brake-switch, and mechanism permitting the movement of the clutch-switch only after the brake-switch has left the "off" position.

10. In a controller for electric circuits, a set of fixed contacts, two sets of contacts movable with respect to each other and also with respect to said fixed contacts, and means for limiting the relative movement of said two sets of contacts.

11. In a controller for electric circuits, a set of fixed contacts, two sets of contacts movable with respect to each other and also with respect to said fixed contacts, the sets of movable contacts being so arranged that on moving the controller in one direction a resistance is decreased without opening the circuit, while on moving it in the opposite direction the circuit is opened before the resistance is increased.

12. The combination with a brake of a switch arranged by one movement to gradually apply force to the brake, and by another movement to reduce the force applied and, momentarily, to allow the brake to be released to quickly adjust itself to the new force acting.

13. The combination with a brake of an electric motor for applying the brake and a switch arranged by one movement to gradually apply force to the brake, and by another movement to reduce the force applied and, momentarily, to allow the brake to be released to quickly adjust itself to the new force acting.

14. The combination with a pair of constant-potential mains, of a storage battery with a resistance in series therewith connected across said mains, a switch for applying the current from the battery to a useful purpose, and contacts upon the switch adjusted to decrease the effective magnitude of the resistance when the switch is closed.

15. The combination with an electric vehicle, of a storage battery in series with a resistance connected to the source of supply of said vehicle, an electromagnetically-controlled device for varying the motor-circuits of the vehicle, a switch for controlling the electromagnetically-controlled device, and contacts on the switch arranged to decrease the effective magnitude of the resistance in series with the storage battery when the switch is closed.

16. The combination of an electric motor, means for varying the torque of said motor, a clutch for said motor, a switch for operating said clutch, and connections so arranged that movement of the switch to operate the clutch open-circuits the motor.

17. The combination with an electric motor, of a controller for the motor, a magnetic clutch for the motor, a switch for operating the magnetic clutch, connections so adjusted that the movement of the switch to vary the clutch open-circuits the motor, and an interlock arranged to open-circuit the clutch when the motor-controller is actuated.

18. In a switch, the combination of a plurality of sets of moving contacts, with means for shifting one of the sets so that the two sets are in different relations in the opening and closing of the switch.

19. In a cylindrical switch, the combination of two sets of moving contacts, with means for bringing the contacts into line as the switch moves in one direction, and for changing their relation so that they are out of line as the switch moves in the other direction.

20. In a switch, the combination of two sets of moving contacts, means for bringing the two sets of contacts in a line as the switch moves in one direction, and for bringing one set in line with the intervals between those of the other set as the switch moves in the other direction.

In witness whereof we have hereunto set our hands this 14th day of September, 1898.

WILLIAM B. POTTER.
FRANK E. CASE.

Witnesses:
B. B. HULL,
M. H. EMERSON.